July 17, 1923.

L. J. McKONE

DOLLY JACK

Filed July 8, 1921

L. J. McKONE

DOLLY JACK

Filed July 8, 1921

L. J. McKONE

DOLLY JACK

Filed July 8, 1921 10 Sheets-Sheet 8

1,462,039

Witnesses
Inventor

July 17, 1923.

L. J. McKONE

DOLLY JACK

Filed July 8, 1921

Witnesses:

Inventor

July 17, 1923.

L. J. McKONE

DOLLY JACK

Filed July 8, 1921      10 Sheets-Sheet 10

1,462,039

Patented July 17, 1923.

1,462,039

UNITED STATES PATENT OFFICE.

LEO J. McKONE, OF CHICAGO, ILLINOIS, ASSIGNOR TO MID-WEST MANUFACTURING COMPANY, OF MINNEAPOLIS, MINNESOTA, A CORPORATION OF SOUTH DAKOTA.

DOLLY JACK.

Application filed July 8, 1921. Serial No. 483,148.

*To all whom it may concern:*

Be it known that I, LEO J. McKONE, a citizen of the United States, residing at Chicago, in the county of Cook and State of Illinois, have invented certain new and useful Improvements in Dolly Jacks, of which the following is a description.

My invention relates to improvements in lifting trucks, and more particularly to that class of lifting trucks known as dolly jacks, which are generally used for the purpose of lifting motor vehicles or the like.

One of the objects of my invention is to provide a jack as above described which may be operated at a distance from the motor vehicle both to lift and to lower said motor vehicle.

Another object of my invention is to provide a jack of the kind described which shall have means associated therewith whereby the lowering of the load carried by said jack shall be in one continuous stage, there being check means whereby the lowering movement is retarded.

Another object of my invention is to provide an adjustable operating handle for the jack, whereby various vantage points may be procured for the operation thereof so that the jack may adapt itself to a wide range of types and shapes of motor vehicle bodies without in any way detracting from the efficiency of the jack.

Another object of my invention is to provide means operable at the operating handle for initially raising the jack-lifting cap to engage the body to be lifted prior to the operating of the handle for the actual lifting operation, and to lower the jack away from the load after the load has been released.

The invention has among its other objects the production of a device of the kind described which is simple, convenient, compact, durable, reliable, efficient and satisfactory for use wherever found applicable.

To this end my invention consists in the novel construction, arrangement and combination of parts herein shown and described, and more particularly pointed out in the claims.

In the drawings, wherein like reference characters indicate like or corresponding parts.

Figures 1, 2, 3:
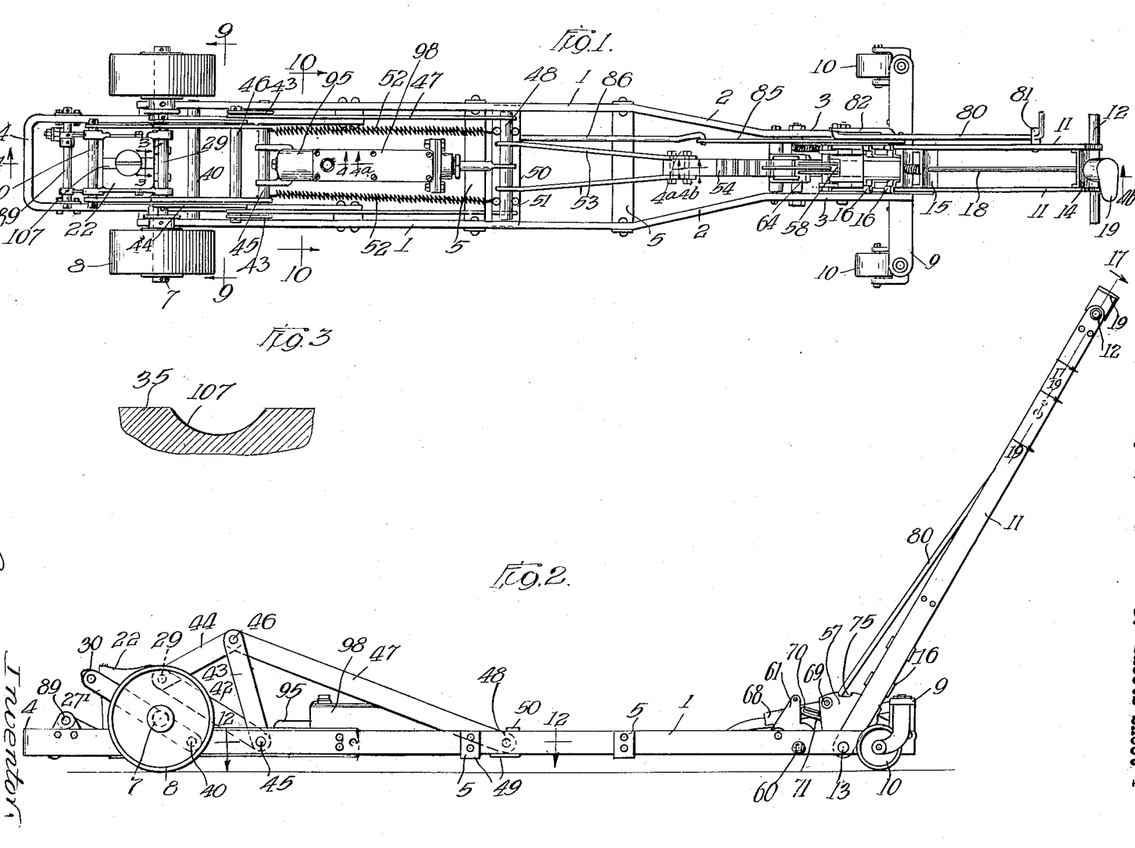
Fig. 1 is a top plan view of my improved lifting jack.
Fig. 2 is a side elevation of the same.
Fig. 3 is a section taken substantially on the line 3—3 of Fig. 1.
Figure 12:
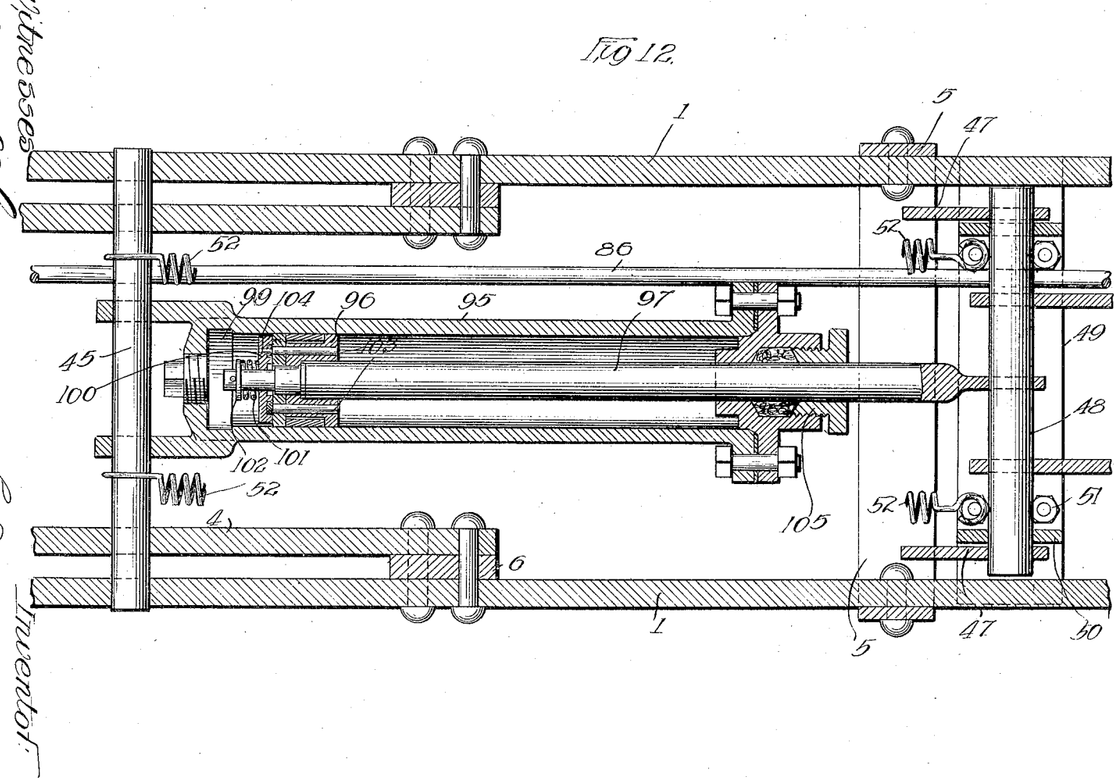
Fig. 12 is a section taken substantially on the line 12—12 of Fig. 2.
Figure 13:
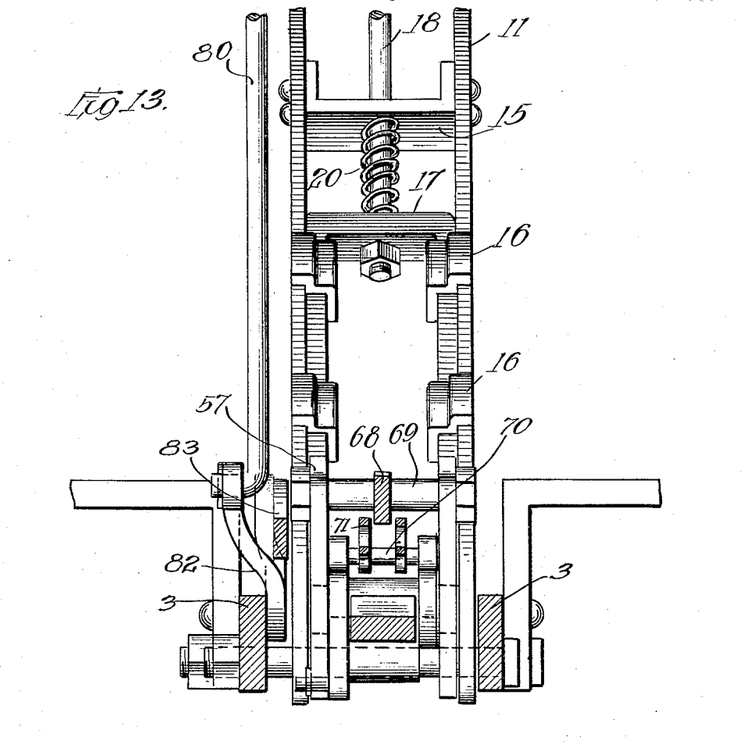
Fig. 13 is a section taken substantially on the line 13—13 of Fig. 4ᵇ.
Figure 14:
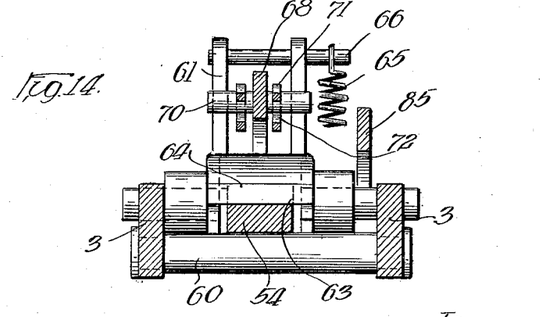
Fig. 14 is a section taken substantially on the line 14—14 of Fig. 4ᵇ.

In the preferred embodiment of my invention, as shown in the drawings, I have indicated a supporting or carrying frame, comprising side members 1—1 converging towards each other as at 2 and thence extending parallel as at 3. To the rear portion of said frame members 1 is secured a U-shaped portion 4, the legs of said U bar reinforcing the side frames 1 and spaced therefrom by filler plates 6, as shown in Fig. 12. Spacing members 5, as shown in Figs. 1 and 2, are secured between the frame members 1—1, said spacing members serving also as limiting stops for the lifting mechanism as will be hereinafter more particularly described.

The frame is provided with wheels, castors, or the like, whereby the jack may be easily moved from place to place, as desired, the rear wheels 8 being sufficiently heavy to withstand the load to be supported by the jack and, as shown, each wheel 5 carried by a stub axle 7. The front wheels 10 are carried by arms 9 extending laterally of the frame, and are mounted so as to swivel. An operating handle, comprising a pair of spaced bars 11, as shown, is positioned adjacent the front end of the frame, there being a pin 12 inserted through said spaced members 11 at the free end thereof, as shown in Figs. 1 and 2, whereby the handle may be gripped for moving or operating the jack, said handle being pivoted to the frame at 13, and the side members 11—11 being spaced apart at their upper end by a member 14 secured therebetween and at their lower end by a member 15, both said spacing members 14—15 having apertures 21 in alignment and adapted to receive the latch rod 18, as will be described.

Figure 4:
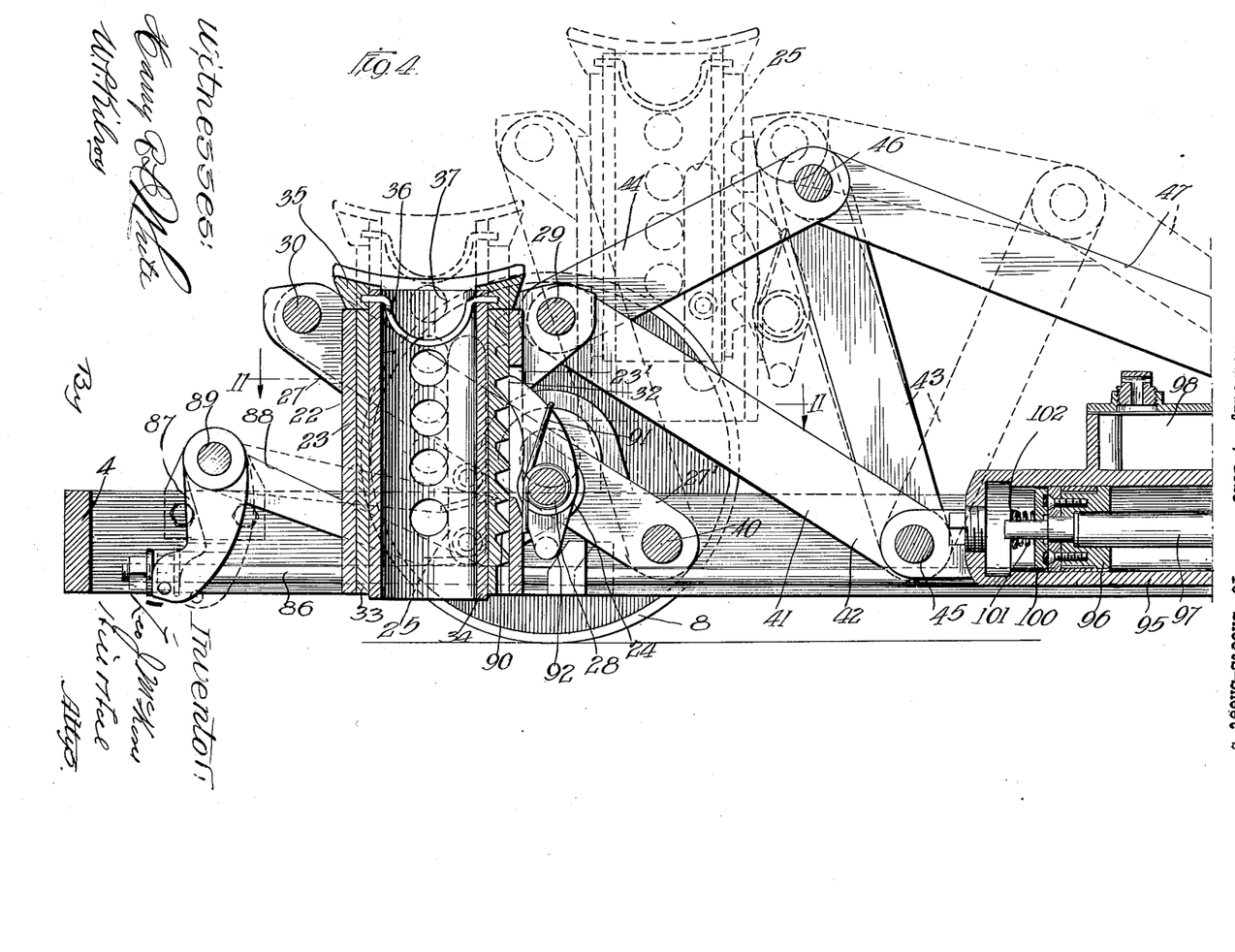
Fig. 4 is a section taken substantially on the line 4—4 of Fig. 1.
Figures 4A, 5:
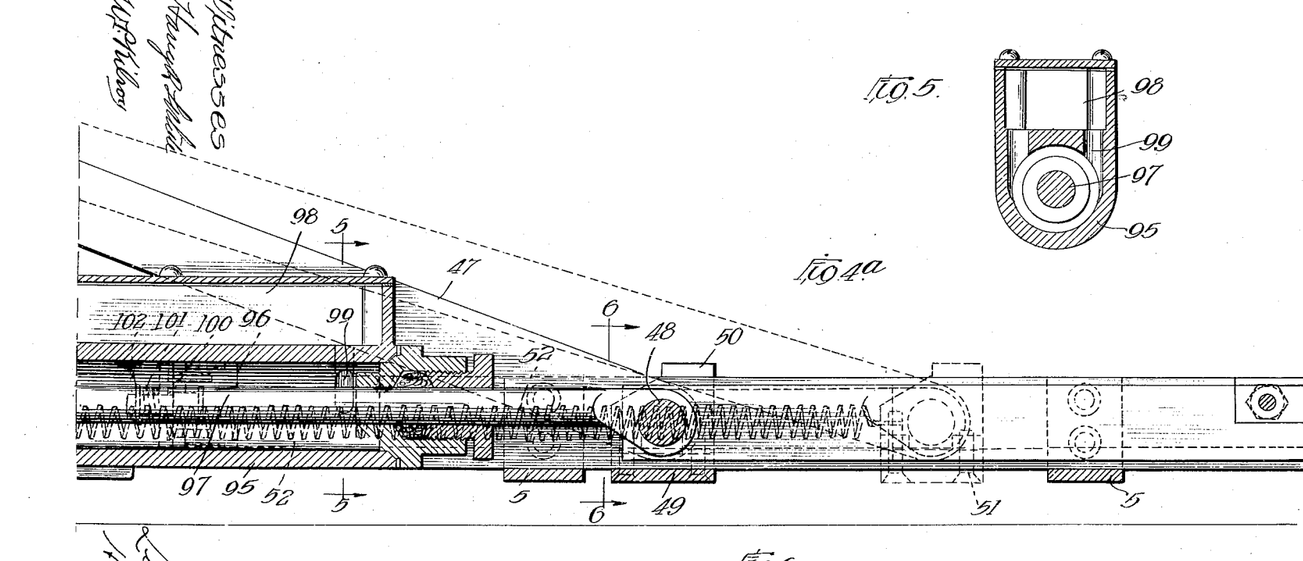
Fig. 5 is a section taken substantially on the line 5—5 of Fig. 4ᵃ.
Figure 15:
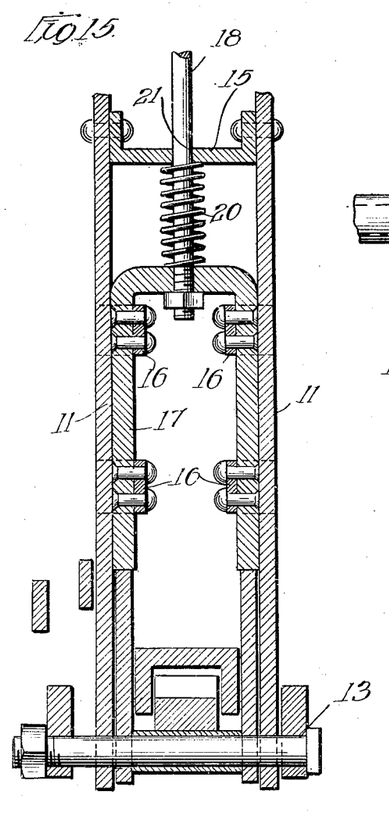
Fig. 15 is a section taken substantially on the line 15—15 of Fig. 4ᵇ.
Figure 16:
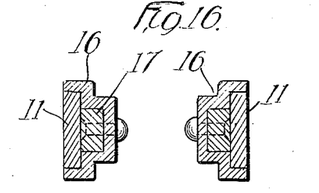
Fig. 16 is a section taken substantially on the line 16—16 of Fig. 4ᵇ.
Figure 17:
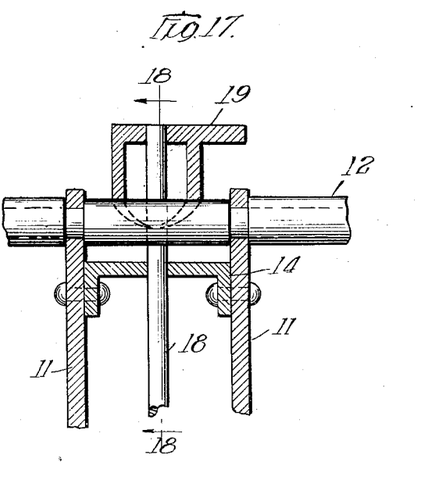
Fig. 17 is a section taken substantially on the line 17—17 of Fig. 2.
Figure 18:
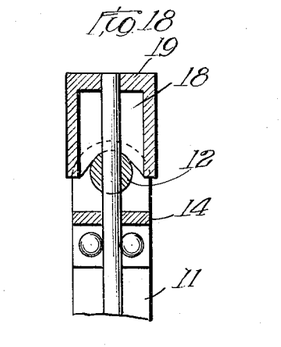
Fig. 18 is a section taken substantially on the line 18—18 of Fig. 17.
Figure 19:
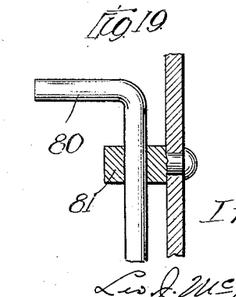
Fig. 19 is a section taken substantially on the line 19—19 of Fig. 2.

The latch rod 18 is slidable through said apertures 21 and has a yoked lower end 17, as shown more clearly in Figs. 4ᵇ and 15, said yoked end 17 having a pair of guides or slippers 16 secured thereto and adapted to snugly engage and slide within the spaced bars 11—11. The upper end of the rod 18 has a cam lever 19 secured thereto and is mounted on the pin 12, whereby a turning of the lever 19 will raise the yoke 17 against the pressure of a spring 20 secured between the members 17 and the spacer 15 for the purpose of releasing the handle from operative engagement with a pawl-carrying sector, as will be hereinafter described.

Figure 11:
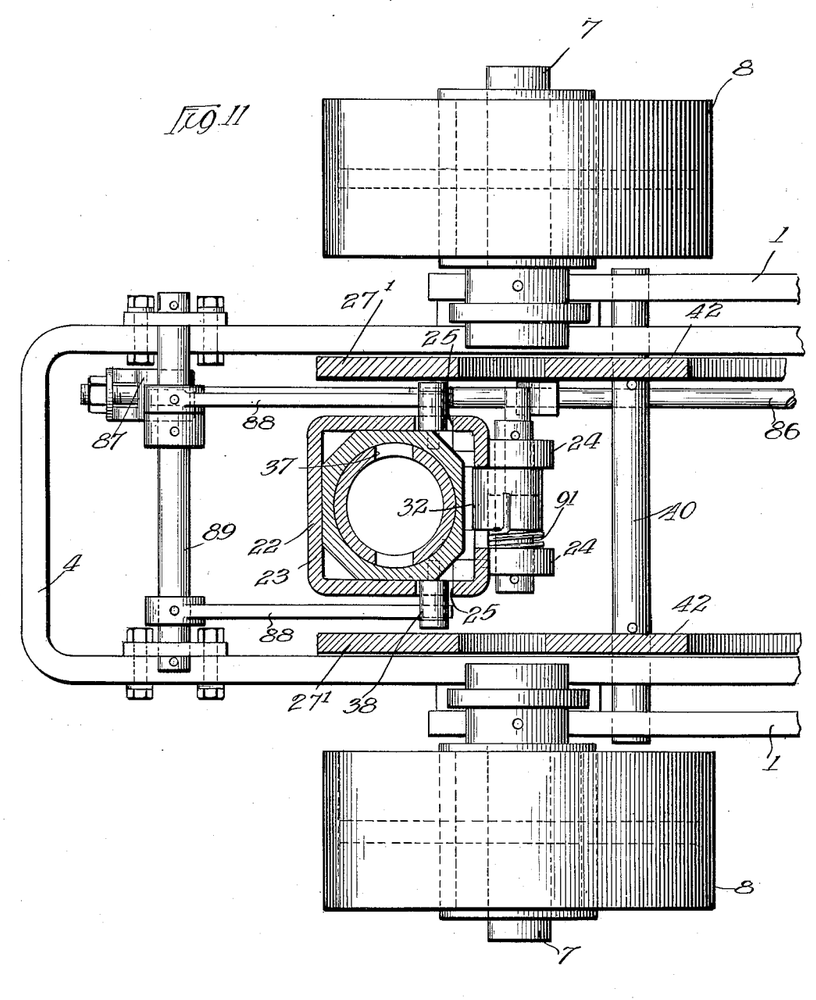
Fig. 11 is a section taken substantially on the line 11—11 of Fig. 4.

The load-lifting cap 22 is carried at the rear end of the frame, so as to be pivotally movable in a vertical plane therein, said cap or lifting head being in telescopic sections, the inner one being cylindrical so as to swivel, and the outer one comprising a casing 23 having a slot 23' in the wall thereof, and carrying lugs 24 adjacent the bottom thereof, there being a pivot pin 28 positioned between said lugs for carrying a pawl 32. The telescopically movable sections within the casing 23 comprise cap member sections 33 and 34, the innermost member 34 having a load-engaging head 35 at its upper end, said head being detachably held to said section 34 by a spring insert 36, said spring insert serving also as a lifting handle for withdrawing the head and section 34 outwardly of the remaining head sections for the purpose of adjustment, if so desired, there being apertures 37 spaced longitudinally of the section 34 through the walls thereof, whereby a pin may be inserted to rest upon the cooperating sections 33 and 23. The walls of the casing 23 have longitudinal slots 25 therein at opposite sides thereof, as shown in Figs. 4 and 11, the section 33 having pins 38 carried thereby and projecting through said slots, whereby the sections 33—34 may be moved independently of said casing by engaging said pins 38 from the operating handle, as will be hereinafter more fully described.

Figure 7:
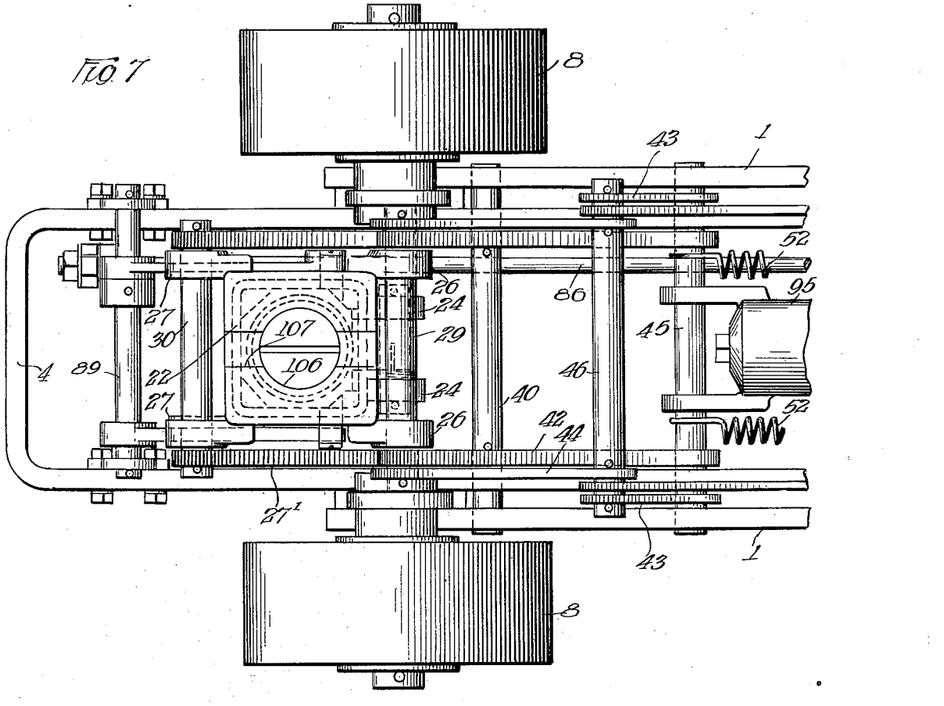
Fig. 7 is a top plan view of the rear portion of the lifting jack showing the connection of the load-carrying cap.
Figure 8:
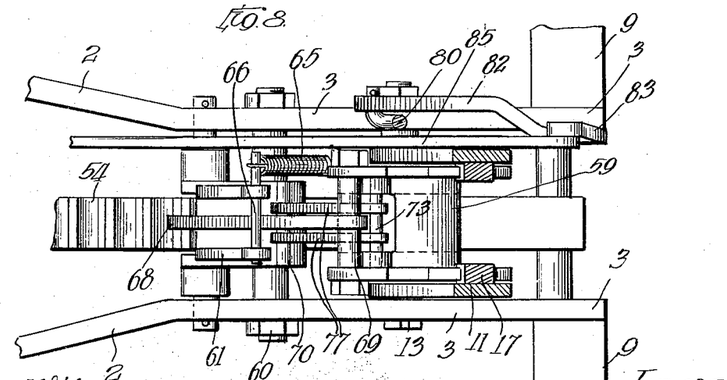
Fig. 8 is a top plan view of the front end of the device, showing the operating handle in section.
Figure 9:
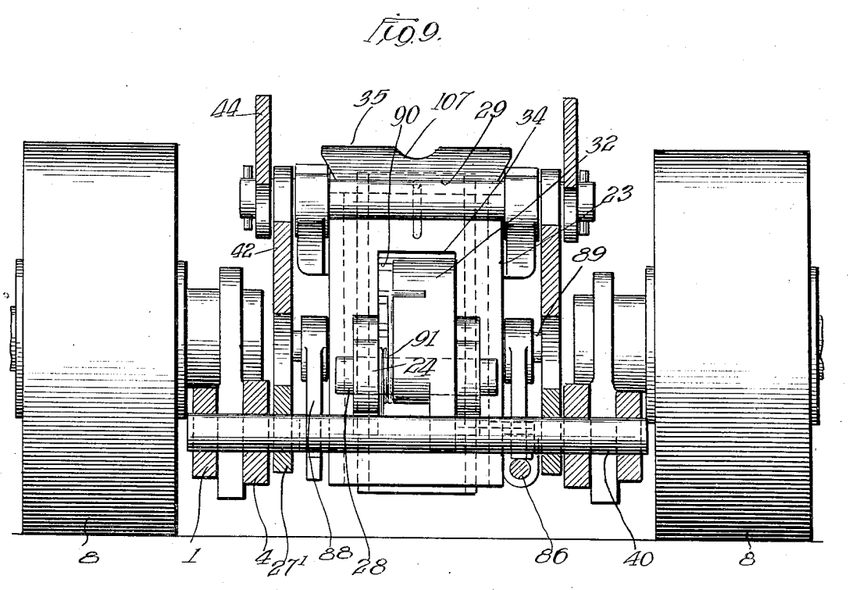
Fig. 9 is a section taken on the line 9—9 of Fig. 1.
Figure 10:
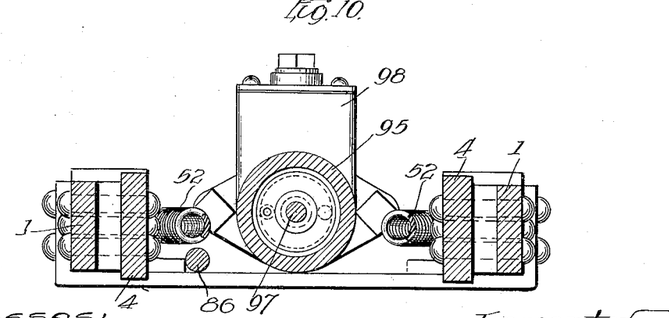
Fig. 10 is a section taken substantially on the line 10—10 of Fig. 1.

The casing 23 has at its upper end pairs of spaced lugs 26 and 27 adapted to receive therethrough pins 29 and 30 respectively, whereby the cap may be carried and actuated as a whole. Pivotally secured to the pin 30, on opposite sides of the cap, as shown in Figs. 4 and 7, are links 27', the other ends of said links being fixedly pivoted to the frames at the pin 40.

Pivotally secured on opposite ends of the pin 29 are truss frames 41, each comprising three rods or links 42, 43 and 44, tied together at their ends to form a rigid triangle, each triangular frame being pivoted to the pin 29 at the apex of the meeting link members 42 and 44, and pivoted to the frame of the jack at the apex of the meeting members 42 and 43 at the pin 45. It will be noted that the pivotal axes of each of the pins 29, 45 and 46 at the apexes, lie in different vertical planes, 29 and 46, both lie to one side of the axis of the pin 45, and the axis of the pin 46 lies intermediate the other axes so that as a pull is exerted on the pin 46, it will tend to raise it to a higher elevation, while at the same time raising the pin 29 and the lifting head of the jack. This method of linkage greatly increases the effective leverage applied to raise the cap.

Pivotally secured to the pin 46 at opposite sides thereof are links 47, the free ends of said links being secured to a draw-bar or pin 48 slidably mounted on the side frames 1—1.

The draw bar 48 is held in place between screws 51 or the like secured to a plate 49, said plate being slidably engageable with the underside of the side frames 1 and there being substantially Z-shaped angle irons 50 secured to said plate by said screws 51 and slidably engaging the upper surface of the side bars 1, whereby vertical displacement of the draw bar relative to said frame is prevented.

The draw bar 48 has secured thereto at its ends springs 52, the opposite ends of said springs being secured to the ends of the pivot pin 45, whereby movement of said draw bar 48 will be against the action of the spring 52, the limit stops 5 serving as abutments to engage with the plate 49 at opposite ends of its travel.

Figure 4B:
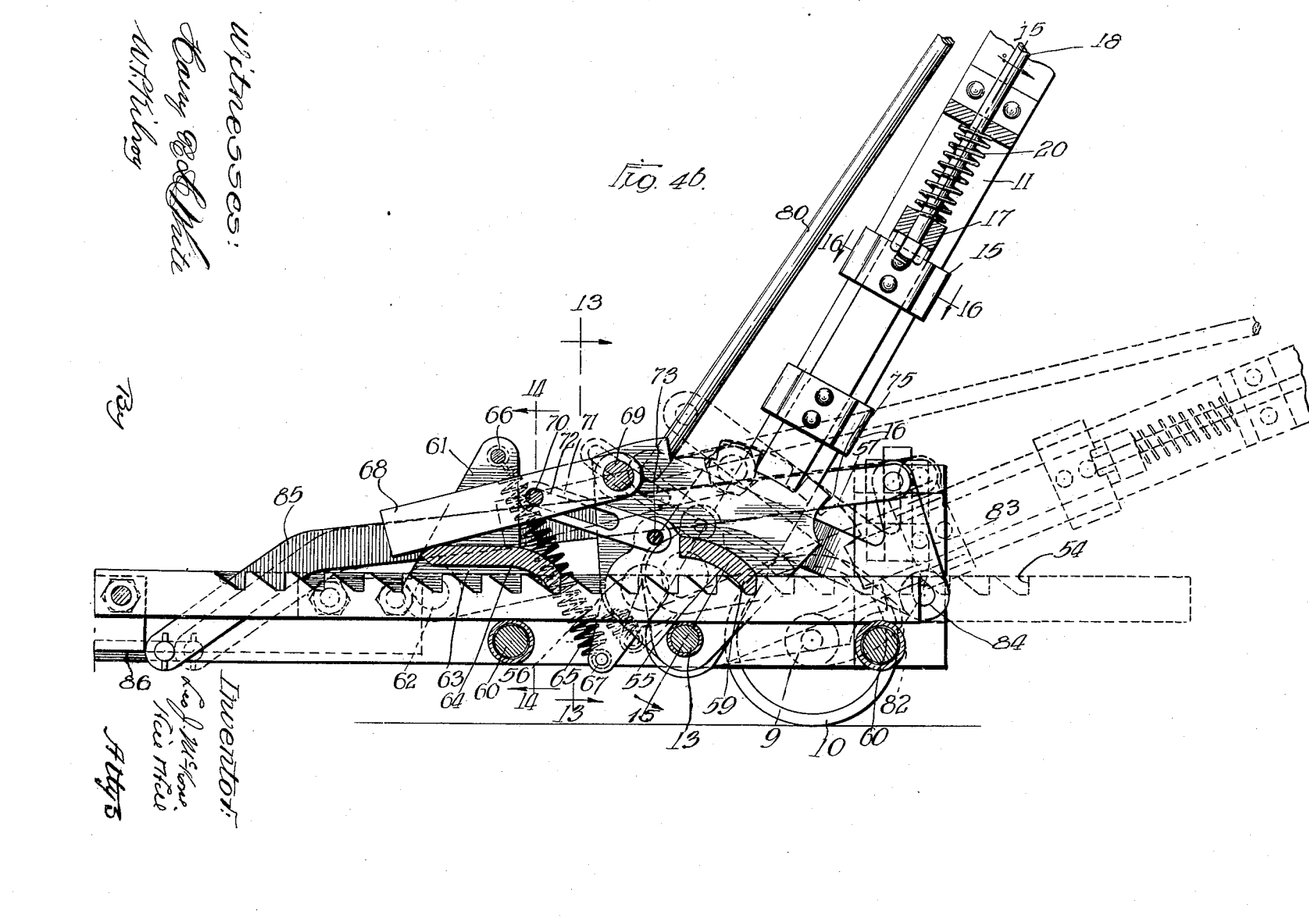
Figure 6:
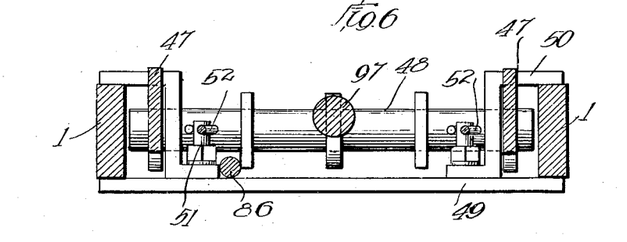
Fig. 6 is a section taken substantially on the line 6—6 of Fig. 4ᵃ.

Secured to the draw bar 48 are a pair of spaced tension members 53 having a rack bar 54 secured thereto at their outer or free end, the teeth in said rack being of any desired number or size, or shape, but preferably have an abutment at their trailing side to serve as stops. A pawl 55 is pivotally mounted on a pin 56, as shown in Fig. 4$^b$, said pin 56 being carried by a pair of sectors 57 pivoted to the pin 13 upon which the operating handle members 11 are pivoted, said pawl being cut away or centrally recessed at 58 so as to straddle the rack and form an overhanging tooth portion 59 engageable with the teeth of the rack 54. Spacers 60 are positioned at any desired points between the portions 3 of the frame to hold said frame members apart. Adapted to cooperate with the raising or lifting pawl 55 is a holding pawl 61 which is pivoted to the jack frame at 62, rearwardly of the pivot 56 of the pawl 55, said holding pawl being channeled or centrally cut away at 63 so as to straddle the rack and to provide an overhanging tooth 64. A spring 65 connects said pawls, said spring having one end connected to a pin 66 adjacent the top of the pawl 61 and to a pin 67 adjacent the lower end of the pawl 55 so that said spring tends to hold the teeth of both pawls in engagement with the rack so that a lifting or releasing movement of the teeth 59 of the pawl 55 will force the tooth 64 of the pawl 61 to be more tightly engaged with the teeth of the rack to hold it against accidental release. A bar 68 is pivoted at one end 69 to the sector 57, the free end of said bar being slidable between the spaced arms of the pawl 61 and resting on the back of the tooth 64, said member 68 having a pin 70 transversely arranged thereon so that a rearward movement of the sector with its member 68 will cause the pin 70 to bear against and release the pawl 61 from its engagement with the rack 54. A pair of links 71 each having an elongated slot 72, adapted to slidably engage the pin 70, are pivotally connected at 73 to the pawls 55, said links allowing loose play between the pawls 55 and 61 and limiting their independent movement at both ends of the slot 72, whereby said pawl 55 may successively engage and be released from the teeth of the rack 54 without releasing the holding pawl 61 to permit the rack to be wholly released from load-lifting engagement, but upon a further or continued releasing or backward movement of the sectors 57 carrying the pawl 55, will cause the pin 70 or the links 72 to engage the pawl 61 and thus release both said pawls in unison from their operative engagement with the rack, thereby permitting the springs 52 to move the rack and draw-bar to normal inoperative position releasing the load carried by the lifting head 22, and dropping the lifting cap to its lowest position.

The sectors 57 have a series of notches 75 therein, whereby the spaced ends of the yoke 17 of the handle may be detachably engageable in either of said notches to operate said sectors and the lifting pawl carried thereby. This adjustability of the handle relative to the operating sector is quite necessary when it is taken into consideration that the body of the motor vehicle being lifted may be of such height or shape that the operative movement of the handle might be interfered with. Further, the adjustability of the handle provides a selective series of vantage points for the operation of the sector. In order to release the handle from its operative engagement with the sector, the lever 19 is turned to lift the latch rod 18, thus moving the yoke 17 out of engagement with the notches 75 of the sectors.

In order that the lifting cap or head may be initially engaged with the load to be lifted prior to the operating movement of the rack, I have provided a rod 80 carried by a bracket 81 offset from the handle 11, the lower end of the rod 80 being pivotally connected to a bell-crank lever having arms 82—83 pivoted to the jack frame at 84. The free end of the arm 83 of the bell-crank is pivotally connected to a link 85, the opposite end of said link being pivoted to a link 86, as shown in Figs. 4 and 4$^b$. The rear end of the link 86 is operatively connected to a bell-crank having arms 87 and 88, pivoted to the jack frame at 89, the lever arm 88 being engageable at its free end and with the lifting pins 38 on the cap section 33, whereby a lifting of the rod 80 will be transmitted from the various links and bell-cranks to effect the lifting of the lever arms 88 upon the pins 38 to effect a raising of the sections 33 and 34 of the lifting cap.

The pawl 32 which is pivoted at 28 is engageable with a rack 90 formed in the wall of the section 33 so as to hold the cap sections against accidental release, as shown in Fig. 4. A spring 91 is arranged on the pawl 32, one end of the spring bearing against the casing 23, and the opposite end against the tooth of the pawl so that the pawl is yieldably held in engagement with the rack. An abutment member 92, as shown in Fig. 4, is positioned upon the rod 86, whereby a rearward movement of said rod after the load has been released from the lifting head will actuate the pawl 32 and release it from the rack 90, thereby permitting the sections 33 and 34 of the lifting head to telescope or drop within the casing 23.

In order that the return or lowering of the cap upon the release of the rack shall not be sudden so as to cause injury to the operator or to the mechanism, I have provided check means for retarding the lowering movement of the load, said check means comprising a casing or cylinder 95 having one end connected to the pin 45 and adapted to receive a plunger or piston 96, said plunger being carried by a piston rod 97 which is connected at one end to the draw bar pin 48, whereby a movement of the draw bar pin will cause the piston 96 to move within the cylinder 95. The cylinder 95 communicates with an oil chamber 98 positioned thereabove, there being ports 99 between said reservoir 98 and the cylinder 95 at one end, as shown in Fig. 4ª. The cap of the piston 100 is movable relative to the body of the piston, as shown in Fig. 12, so as to form a valve, and is yieldably held thereagainst by a spring 101 positioned between the cap 100 and an abutment 102 provided at the end of the piston rod 97. Ports 103 are formed through the body of the piston and communicate with smaller ports 104 formed through the cap 100 so that, as shown in Fig. 12, a movement of the piston rod 97 with the piston to the right, on the work stroke of the rack, will cause the oil in the cylinder to pass through the ducts 103 to the other side or working face of the piston, for when the piston moves in this direction (the lifting direction of the rack), the oil will force the cap 100 away from the body portion of the piston and flow freely. Upon the movement of the piston in the opposite direction or the lowering stroke of the rack, the cap 100 will press tightly against the body of the piston 96 so that the oil in the head end of the chamber must pass through the small port 104 to the opposite side of the piston, thereby checking or retarding the return movement of the rack and the lifting head operatively controlled thereby. Stuffing glands 105 of any desired construction may be secured to the end of the piston chamber opposite to the head end to prevent leakage.

It will be seen that the releasing of both the holding and lifting pawls will permit the springs 52 to pull upon the draw bar and move the rack against the oil in the piston chamber to lower the loaded cap to inoperative position, the springs 52 serving to further lower the cap to its lowermost position after its release from the load, thereby clearing the load and permitting the jack to be moved out from under it.

The cap 22 has a large central recess 106 in the load-engaging surface thereof, whereby any projection of the axle of the motor vehicle lifted by the jack will rest therein, said projection on the axle generally being the oil filler plugs, thus preventing injury to the drain plugs and providing a better seating of the axle in the lifting head.

In order to prevent injury to the truss rods sometimes carried by the axles, and also to improve the seating of the axle in the lifting head, I have provided recesses or slots 107 diametrically across the load-engaging face of the swivel head of the cap.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:

1. In a device of the kind described and in combination, a jack supporting frame, a triangular truss frame pivotally connected thereto and carried thereby, a lifting cap pivotally connected to and carried by said truss frame, a draw bar slidable in the jack frame, a link pivotally connected between said truss frame and draw bar, whereby a pull on said link will elevate the truss frame to raise the cap, a rack carried by said draw bar, and means for operating said rack.

2. In a device of the kind described and in combination, a load-lifting cap, a truss frame pivotally supporting said cap so as to move it in a vertical plane, a supporting frame pivotally carrying said truss frame, a link slidably connected to said supporting frame and pivotally connected to said truss frame, whereby the actuation of said link will pivot the truss frame to raise or lower the cap, a draw bar connected to and controlling said link, a rack carried by said draw bar, and operating means engageable with said rack to actuate said draw bar.

3. In a device of the kind described and in combination, a jack supporting frame, a triangular truss frame pivotally connected thereto at one apex and carried thereby, a lifting cap pivotally connected to and carried by said truss frame at another apex, a link having one end connected to a draw bar slidable in the jack frame, the other end of said link being pivotally connected to the other apex of said truss frame, said last mentioned apex being in a vertical plane intermediate said first and second mentioned apexes, whereby a pull on said link will elevate the truss frame to rase said cap, a rack carried by said draw bar, and means for operating said rack at a point remote from said cap.

4. In a device of the kind described and in combination, a frame, a load-lifting cap, links pivotally supporting said cap in said frame so that it may move in a vertical plane therein, a rack connected to said links, a sector pivoted to said frame and carrying a pivotally mounted lifting pawl engageable with said rack, a holding pawl on said frame operatively engageable with said rack to hold it against accidental release, said sector having a plurality of notches therein, a handle detachably engageable in either of said notches to actuate said sector and the lifting pawl carried thereby, and means for releasing both said pawls in unison from their engagement with said rack to permit the lowering of said cap.

5. In a device of the kind descrbed and in combination, a frame, a load-lifting cap, links pivotally supporting said cap in said frame so that it may move in a vertical plane therein, a rack connected to said links, sectors pivoted to said frame on opposite sides thereof and carrying a pivotally mounted lifting pawl engageable with said rack, a holding pawl on said frame operatively engageable with said rack to hold it against accidental release, said sectors having a plurality of notches therein, a handle carried by said frame and detachably engageable in said notches in said sectors to actuate said sectors and the lifting pawl carried thereby, and means for releasing both said pawls in unison from their engagement with said rack to permit the lowering of said cap.

6. In a device of the kind described and in combination, a jack frame, a load-lifting cap member, links pivotally supporting said cap so that it may move in a vertical plane in said frame, a rack connected to said links, a sector pivotally carried by said frame and having a plurality of notches therein, a lifting pawl pivotally carried by said sector and engageable with said rack, a holding pawl carried by said frame to hold said rack against accidental release when the lifting pawl is out of engagement therewith, a handle detachably engageable in either of the notches in said sector to operate it to move said rack, means connecting said pawls and yieldably holding them in locking engagement with said rack, and means controlled by said lifting pawl to engage said holding pawl to release it from said rack upon full releasing movement of said lifting pawl.

7. In a device of the kind described and in combination, a jack frame, a load-lifting cap, links pivotally supporting said cap so that it may move in a vertical plane in said frame, a rack connected to said links, a pawl carrier pivoted to said frame, a lifting pawl pivotally carried by said carrier and engageable with said rack, a holding pawl pivoted to said frame and engageable with said rack to hold it against accidental release, an arm carried by said pawl carrier, abutment means on said arm adapted to engage with and release said holding pawl, a link slidably connected to said arm so that said pawls may have a definite amount of loose play therebetween, said link being pivoted to said lifting pawl, whereby said lifting pawl may be released without releasing the holding pawl, and the continued releasing movement of said lifting pawl will engage said arm so that said abutment engages with and releases the holding pawl from the rack.

8. A device of the kind described and in combination, a jack frame, a load-lifting member, links pivotally supporting said load-lifting member so that it may move in a vertical plane in said frame, a rack connected to said links, a pawl carrier pivoted to said frame, a lifting pawl pivotally carried by said carrier and operatively engageable with said rack, a holding pawl pivoted to said frame and operatively engageable with said rack to hold it against accidental release, said carrier having a plurality of notches therein, an operating handle selectively engageable in either of said notches for detachably connecting it with said carrier at a plurality of vantage points, and means for yieldably holding said handle in inoperative position.

9. In a device of the kind described and in combination, a frame, a load-lifting cap, links pivotally supporting said cap in said frame so that it may move in a vertical plane therein, a rack connected to said links, a sector pivoted to said frame and carrying a lifting pawl engageable with said rack, a holding pawl engageable with said rack to prevent accidental release thereof, said sector having a plurality of notches therein, a handle engageable in either of said notches to actuate said sector and the lifting pawl, and means for releasing both of said pawls in unison from their engagement with said rack to permit the lowering of said cap.

10. In a device of the kind described and in combination, a jack frame, a load-lifting cap, links supporting said cap so that it may move in a vertical plane in said frame, a rack connected to said links, a pawl carrier carried by said frame, a lifting pawl pivotally carried by said carrier and engageable with said rack, a holding pawl pivoted to said frame and engageable with said rack to hold it against accidental release, an arm carried by said pawl carrier, abutments on said arm to releasably engage said holding pawl, a link slidably engageable with said arm so that said pawls may have a definite amount of play therebetween, said link being pivoted to said lifting pawl, whereby said lifting pawl may be released without releasing the holding pawl, and the continuous movement of said lifting pawl will engage said arm so that said abutments engage with and release the holding pawl from the rack.

11. In a device of the kind described and in combination, a frame, a load-lifting head, means pivotally supporting said lifting head so that it may be moved in a vertical plane in said frame, a rack connected to said supporting means, whereby said supporting means and head may be raised, a pair of spaced sectors pivoted to said frame, a raising pawl carried by said sectors and engageable with said rack, a holding pawl on said frame and also engageable with said rack to prevent accidental release thereof, an operating handle on said frame and selectively engageable with said sectors at a plurality of points thereon, and means for releasing the handle from its engagement with both of said sectors.

12. In a device of the kind described and in combination, a supporting frame, a lifting cap vertically movable therein, a rigidly connected triangular frame member pivoted at one apex to said supporting frame and at another apex to said cap, an operating link pivoted to the remaining apex, and means for actuating said operating link, the pivotal axis of said last mentioned apex being in a vertical plane intermediate the pivotal axes of the remaining apexes, and a link fixedly pivoted to the frame at one end and to the cap at its other end.

In testimony whereof, I have hereunto signed my name in the presence of two subscribing witnesses.

LEO J. McKONE.

Witnesses:
　JOHN W. HILL,
　RUTH W. EPHRAIM.